(12) United States Patent
Tanaka

(10) Patent No.: US 6,490,948 B2
(45) Date of Patent: Dec. 10, 2002

(54) BICYCLE PEDAL

(75) Inventor: Toshiyuki Tanaka, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/156,867

(22) Filed: May 30, 2002

(65) Prior Publication Data

US 2002/0144569 A1 Oct. 10, 2002

Related U.S. Application Data

(63) Continuation of application No. 09/750,018, filed on Dec. 29, 2000, now Pat. No. 6,446,529.

(51) Int. Cl.[7] .................................................. G05G 1/14
(52) U.S. Cl. ............................... 74/594; 74/594; 36/132
(58) Field of Search ............................. 74/594.4, 594.6; 36/131, 132

(56) References Cited

U.S. PATENT DOCUMENTS

| 4,442,732 A | 4/1984 | Okajima |
|---|---|---|
| 5,048,369 A | 9/1991 | Chen |
| 5,931,053 A | 8/1999 | Chen |
| 6,014,914 A | 1/2000 | Ueda |
| 6,105,462 A | 8/2000 | Ueda |
| 6,128,973 A | 10/2000 | Nagano |
| 6,151,989 A | 11/2000 | Ueda |
| 6,196,084 B1 | 3/2001 | Ueda |
| 6,341,540 B2 | 1/2002 | Steinberg |

FOREIGN PATENT DOCUMENTS

| CN | 413212 | 11/2000 |
|---|---|---|

Primary Examiner—Chong H. Kim
(74) Attorney, Agent, or Firm—Shinjyu Global IP Counselors, LLP

(57) ABSTRACT

A bicycle pedal includes a pedal shaft, a pedal body, first and second clamping members and a first biasing member. The pedal body is rotatably mounted on the pedal shaft. The first clamping member has a first cleat engagement surface and is pivotally coupled to one end, while the second clamping member has a second cleat engagement surface and is fixedly coupled to the other end. The second clamping member is configured to form an unobstructed longitudinal passageway. Preferably, the second clamping member includes two outer attachment points and an inner attachment point. Preferably, an adjustment member is arranged between the first clamping member and a biasing member to adjust tension of the biasing member on the first clamping member. The adjustment member has a head arranged in a hole of the first clamping member, an enlarged section and an adjustment plate adjustably mounted on the adjustment member.

19 Claims, 10 Drawing Sheets

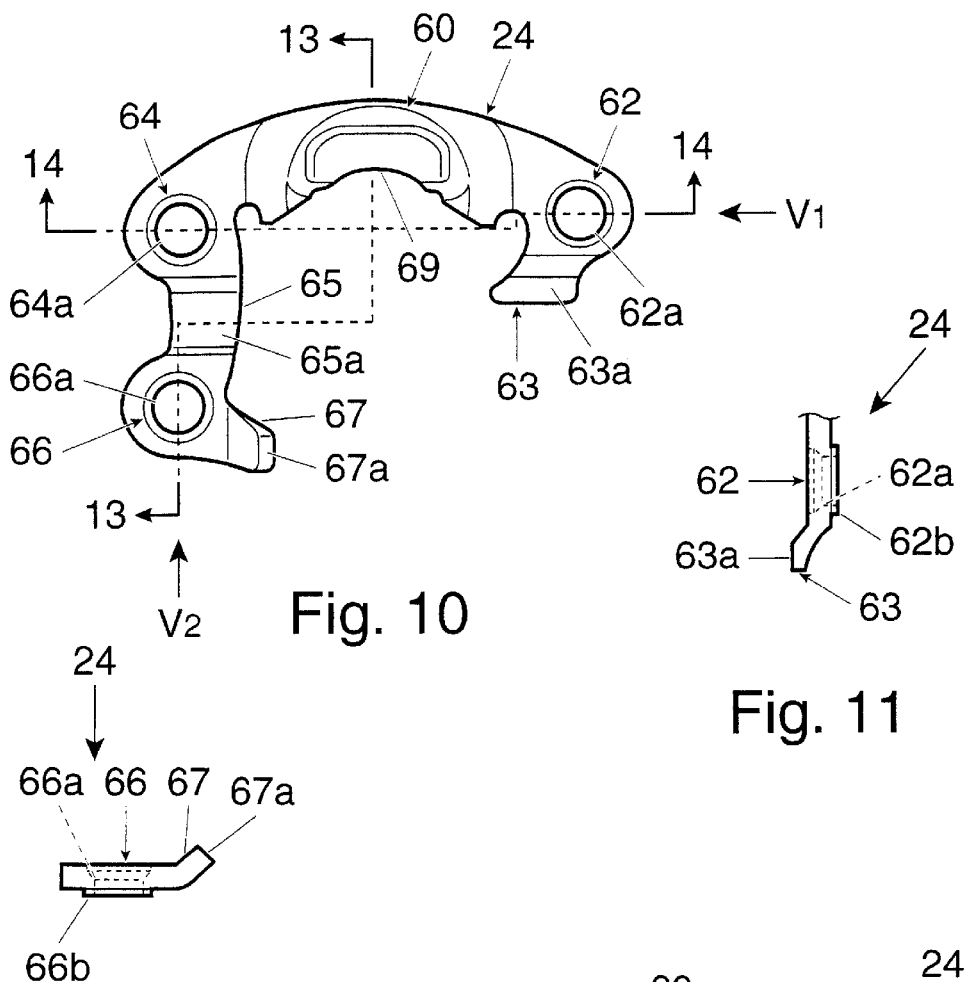
Fig. 10
Fig. 11
Fig. 12
Fig. 13
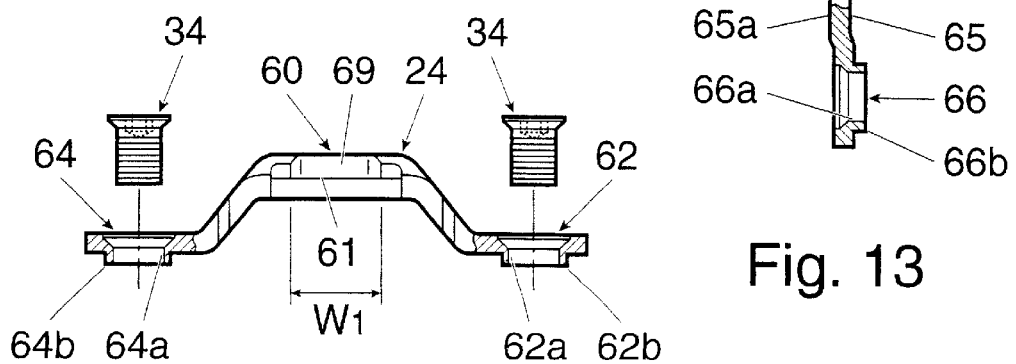
Fig. 14

BICYCLE PEDAL

CROSS REFERENCE TO RELATED APPLICATIONS

This application is a continuation of application Ser. No. 09/750,018, filed Dec. 29, 2000, now U.S. Pat. No. 6,446,529.

BACKGROUND OF THE INVENTION

1. Field of the Invention

This invention generally relates to a bicycle pedal. More specifically, the present invention relates to a clipless or step-in bicycle pedal with a front clamping member having an enlarged unobstructed passageway to allow mud to freely pass therethrough.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the bicycle pedal.

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal the cleat engagement mechanism front and rear cleat clamping members that are fixed on both sides of the pedal body for engaging front and rear portions of a cleat. Road racing pedals typically only has a cleat engagement mechanism on one side of the pedal body. In either case, in this type of bicycle pedal, the rider steps onto the pedal and the cleat engagement mechanism automatically grips on to the cleat secured to the bottom of the cyclist's shoe.

More specifically, when attaching the cyclist's shoe to the step-in pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

When step-in pedals are used for road type bikes, the pedal is typically only provided with a single clamping assembly such that the cyclist's shoe can only be coupled to one of the two sides of the pedal. Off road or mountain type bikes, on the other hand, usually have a pair of clamping assemblies such that the cyclist's shoe can be clamped to either side of the pedal. In either case, it is desirable to design the pedal to be as compact and lightweight as possible.

One problem with most clipless pedals is that they are quite small and can have several moving parts. As a result of these types of pedal designs, the moving parts often can become clogged with dirt or mud in wet riding conditions. Dirt or mud can effect the release of the cleat from the clipless pedal, or affect insertion of the cleat into the clamping members of the clipless pedal. This can especially be a problem if the dirt or mud dries within the moving parts of the clipless pedal. This is usually more of a problem for off-road type bicycle riding. Additionally, in recent years, down hill races, dual slalom races, cross-country races and other such off-road races for mountain bikes and BMX (bicycle motor-cross) have been widely staged. In any of these off-road type races, unlike in road racing, the riders traverse an unpaved track or course. Furthermore, with this type of off-road racing, the foot must be repeatedly taken off the pedal during cornering and replaced on the pedal after the corner has been exited. Similarly, in recreational off-road riding, the cyclist's shoes must often be repeatedly removed and reattached to the bicycle pedals depending on the riding situation. Unfortunately, since off-road riding is performed on unpaved roads, mud clings to the pedals and tends to clog the cleat clamping members. Once the cleat clamping members become clogged with mud, the cleat cannot be engaged in the cleat clamping members and the shoe cannot be attached to the pedal. Moreover, the mud often clogs the biasing mechanism such that the clamping members may not operate properly.

Additionally, many clipless or step-in type bicycle pedals have a tension adjusting mechanism to adjust the biasing force of biasing members of at least one clamping member. Often, these tension adjusting mechanisms include several small parts or pieces. Sometimes it is desirable to have an extremely large or extremely small biasing force applied to at least one of the clamping members for certain riding conditions. However, when tightening or loosening the tension adjusting mechanism of these prior clipless or step-in type bicycle pedals, the parts can become completely detached from other parts of the tension adjusting mechanism and/or the bicycle pedal itself. It can be very difficult to reattach the small parts of the tension adjusting mechanism of these bicycle pedals. Moreover, it is possible that some of the small parts can be lost if parts of the tension adjusting mechanism are detached from the bicycle pedal.

In view of the above, there exists a need for a bicycle pedal which overcomes the above mentioned problems in the prior art. More specifically, in view of the above, it is apparent that there exists a need for a clipless bicycle pedal which limits or prevents dirt, mud, or the like from contaminating the adjustment mechanism and/or biasing member. Additionally, in view of the above, it is apparent that there exists a need for a clipless bicycle pedal which includes a tension adjusting mechanism which limits removal of small parts of the tension adjusting mechanism from the bicycle pedal. This invention addresses these needs in the prior art as well as other needs, which will become apparent to those skilled in the art from this disclosure.

SUMMARY OF THE INVENTION

One object of the present invention is to provide a bicycle pedal, which limits or prevents dirt, mud, or the like, from contaminating the adjustment mechanism and/or the biasing mechanism.

Another object of the present invention is to provide a bicycle pedal with an enlarged unobstructed longitudinal passageway arranged between one of the clamping members and the hub body that allows dirt, mud, or the like, to be extracted from the bicycle pedal body.

Another object of the present invention is to provide a bicycle pedal that is strong, yet relatively lightweight.

Still another object of the present invention is to provide a bicycle pedal that is relatively simple and inexpensive to manufacture and assemble.

Still another object of the present invention is to provide a bicycle pedal with a tension adjusting mechanism, which is not easily removed from the bicycle pedal.

The foregoing objects can basically be attained by providing a bicycle pedal for attaching a shoe thereto via a cleat, comprising a pedal shaft, a pedal body, a first clamping member, a first biasing member and a second clamping member. The pedal shaft has a first end adapted to be coupled to a bicycle crank and a second end with a center axis extending between the first and second ends. The pedal body is rotatably coupled to the second end of the pedal shaft. The pedal body has a first end and a second end with inner and outer longitudinal sides extending between the first and second ends. The pedal body has a longitudinal plane extending between the first and second ends and passing through the center axis of the pedal shaft. The first clamping member is pivotally coupled to the first end of the pedal body between a clamping position and a release position. The first clamping member has a first cleat engagement surface. The first biasing member is coupled between the pedal body and the first clamping member. The second clamping member is coupled to the second end of the pedal body. The second clamping member has a second cleat engagement surface arranged between the inner and outer longitudinal sides of the pedal body and facing the longitudinal plane of the pedal body. The second clamping member is configured to form an unobstructed longitudinal passageway. The unobstructed longitudinal passageway has a height at least substantially equal to the distance between the second clamping member and the second end of the pedal body, and a width at least as large as a width of the second cleat engagement surface.

The foregoing objects can also basically be attained by providing a bicycle pedal for attaching a shoe thereto via a cleat, comprising a pedal shaft, a pedal body, a first clamping member, a first biasing member, and a second clamping member. The pedal shaft has a first end adapted to be coupled to a bicycle crank and a second end with a center axis extending between the first and second ends. The pedal body is rotatably coupled to the second end of the pedal shaft. The pedal body has a first end with first inner and outer flanges and a second end with second inner and outer flanges to form inner and outer longitudinal sides extending between the first and second ends. The pedal body has a longitudinal plane extending between the first and second ends and passing through the center axis of the pedal shaft. The first clamping member is pivotally coupled to the first end of the pedal body between a clamping position and a release position. The first clamping member has a first cleat engagement surface. The first biasing member is coupled between the pedal body and the first clamping member. The second clamping member is fixedly coupled to the second end of the pedal body. The second clamping member has an inner attachment point coupled to the second inner flange, an outer attachment point coupled to the second outer flange, an additional attachment point coupled to the first outer flange and a second cleat engagement surface. The second cleat engagement surface is arranged between the inner and outer longitudinal sides of the pedal body and faces the longitudinal plane. The second clamping member is configured to form an unobstructed longitudinal passageway. The unobstructed longitudinal passageway has a height at least substantially equal to the distance between the second clamping member and the second end of the pedal body and a width at least as large as a width of the second cleat engagement surface.

The foregoing objects can also basically be attained by providing a bicycle pedal for attaching a shoe thereto via a cleat, comprising a pedal shaft, a pedal body, a first clamping member, a first biasing member, an adjustment member, and a second clamping member. The pedal shaft has a first end adapted to be coupled to a bicycle crank and a second end. The pedal body is rotatably coupled to the second end of the pedal shaft. The pedal body has a first end and a second end with a longitudinal axis extending between the first and second ends. The first clamping member is pivotally coupled to the first end of the pedal body between a clamping position and a release position. The first clamping member has a first clamping portion with a first cleat engagement surface and an adjustment portion with a hole formed therein. The first biasing member is coupled between the pedal body and the first clamping member. The adjustment member is arranged between the first clamping member and the biasing member. The adjustment member has a head arranged in the hole of the adjustment portion, an enlarged section arranged on a biasing member side of the adjustment portion, and an adjustment plate adjustably mounted on the adjustment member to adjust tension of the biasing member on the first clamping member. The second clamping member is coupled to the second end of the pedal body. The second clamping member has a second cleat engagement surface.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 10 is a top plan view of the front clamping member for the bicycle pedal illustrated in FIGS. 1–5;

FIG. 11 is a partial, inside elevational view of the front clamping member illustrated in FIG. 10 as viewed along arrow $V_1$;

FIG. 12 is a partial, rear side elevational view of the front clamping member illustrated in FIGS. 10 and 11 as viewed along arrow $V_2$;

FIG. 13 is a partial, cross-sectional view of the front clamping member illustrated in FIGS. 10–12 as viewed along section line 13—13 of FIG. 10;

FIG. 14 is a partial, cross-sectional view of the front clamping member illustrated in FIGS. 10–13 as viewed along section line 14—14 of FIG. 10;

DETAILED DESCRIPTION OF THE PREFERRED EMBODIMENTS

Figure 1:
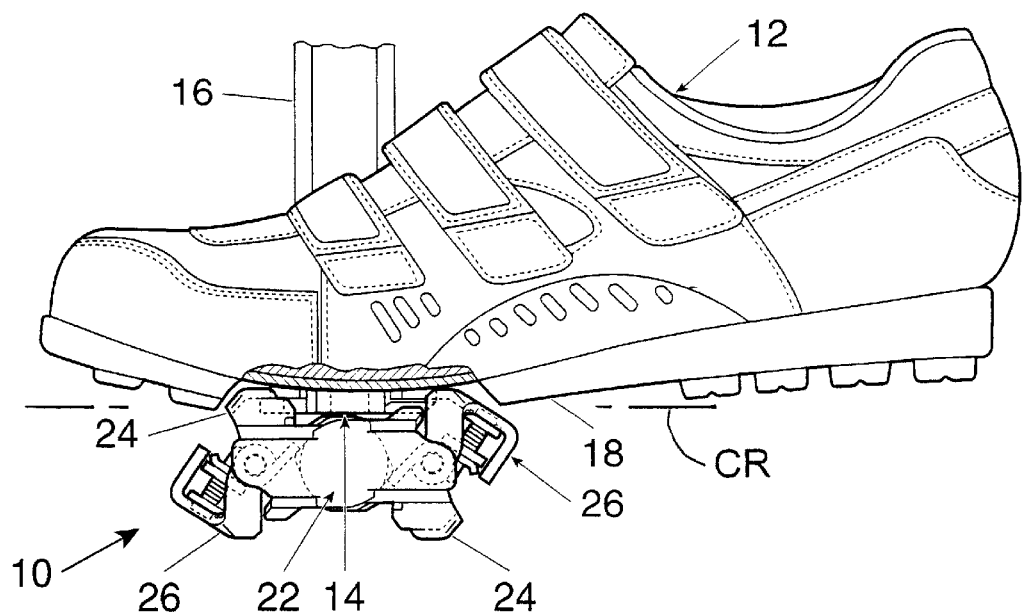
FIG. 1 is an outside elevational view of a bicycle shoe attached to a left bicycle clipless pedal coupled to a cleat of the bicycle shoe in accordance with a preferred embodiment of the present invention.

Referring initially to FIGS. 1–4, a bicycle pedal 10 is illustrated in accordance with a preferred embodiment of the present invention. Bicycle pedal 10 is a clipless or step-in pedal that can be used with a bicycle shoe 12 with a cleat 14 coupled thereto. Bicycle pedal 10 is especially designed for use with off-road bicycles as opposed to use with a road bicycle. Of course, bicycle pedal 10 can be used on a road bicycle or any type of bicycle if needed and/or desired. As seen in FIG. 1, bicycle pedal 10 is fixedly coupled to bicycle crank arm 16 of a bicycle for rotation therewith, while cleat 14 is fixedly coupled to the bottom of the sole 18 of shoe 12.

Bicycle pedal 10, illustrated in FIGS. 1–4, is a left side pedal. Of course, the same pedals are provided on the right and left sides of the bicycle, except that the right side pedal is a mirror image of the left side pedal 10. Accordingly, the right side pedal will not be discussed or illustrated in detail herein.

Figure 2:
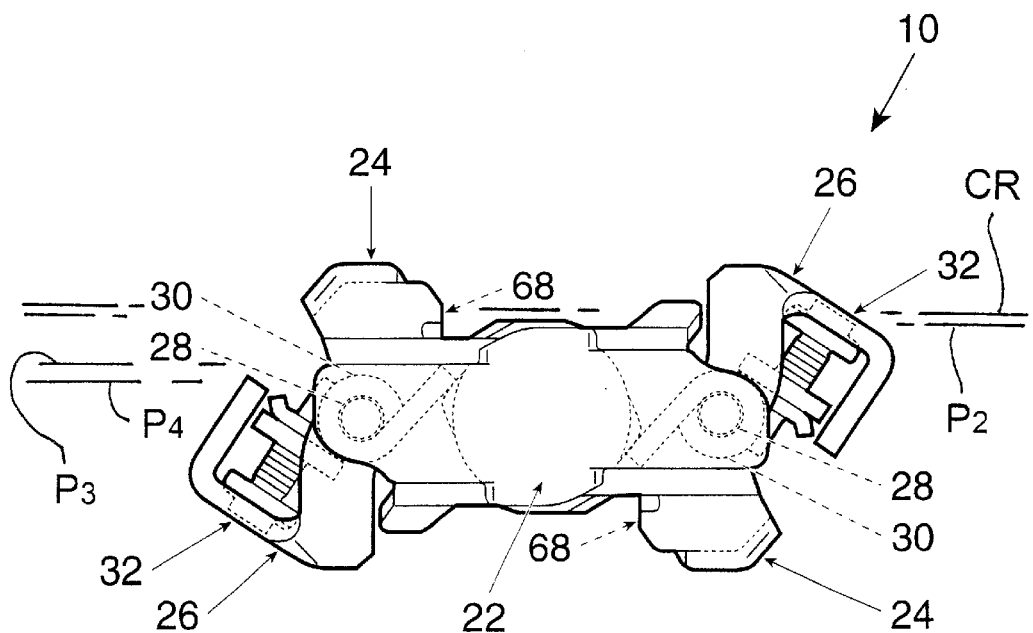
FIG. 2 is an outside elevational view of the left bicycle pedal illustrated in FIG. 1 in accordance with the preferred embodiment of the present invention.
Figure 3:
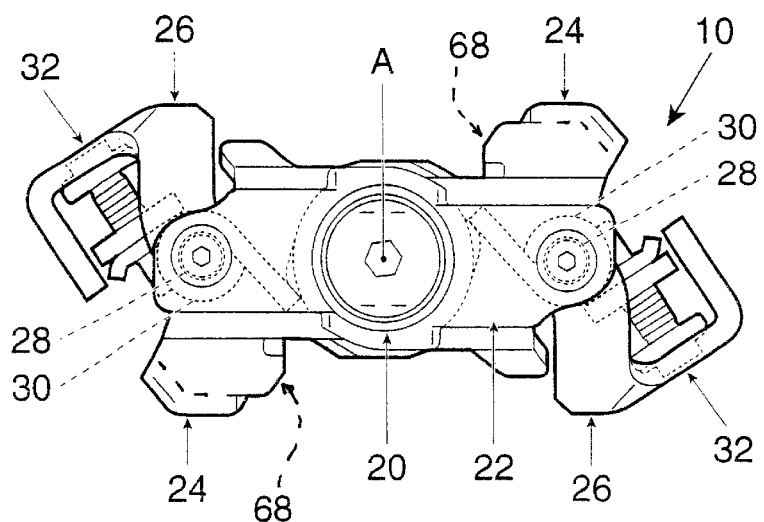
FIG. 3 is an inside elevational view of the left bicycle pedal illustrated in FIGS. 1 and 2 in accordance with the preferred embodiment of the present invention.
Figure 4:
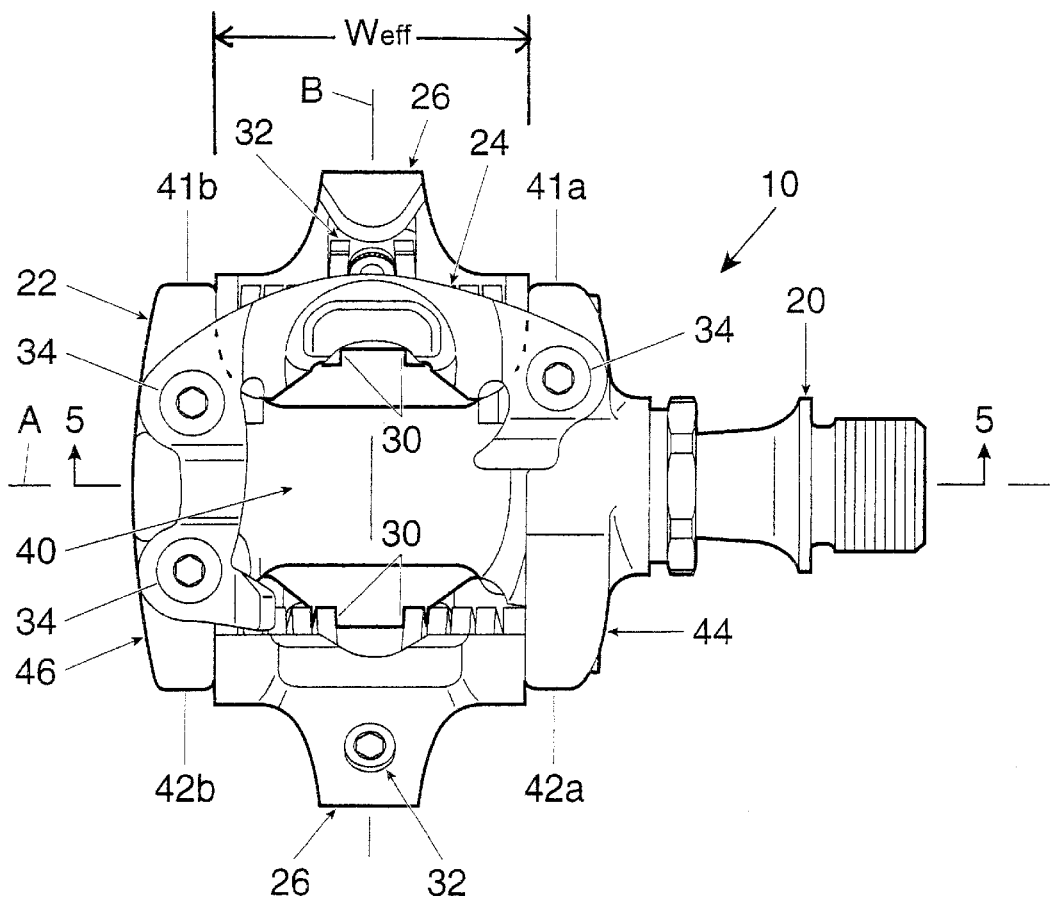
FIG. 4 is a top plan view of the left bicycle pedal illustrated in FIGS. 1–3 in accordance with the preferred embodiment of the present invention.
Figure 5:
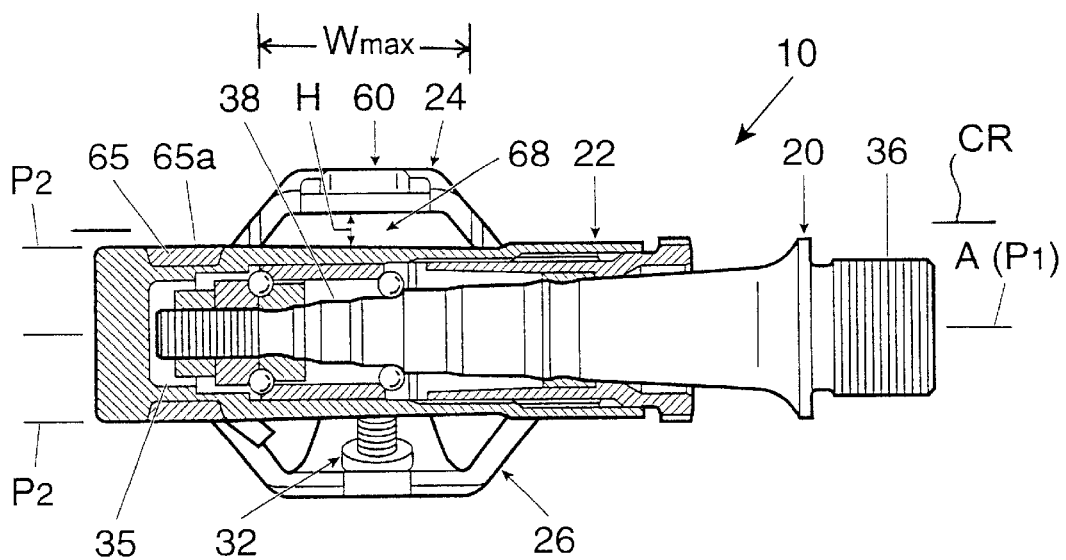
FIG. 5 is a longitudinal cross-sectional view of the bicycle pedal illustrated in FIGS. 1–4 as seen along section line 5—5 of FIG. 4.
Figure 6:
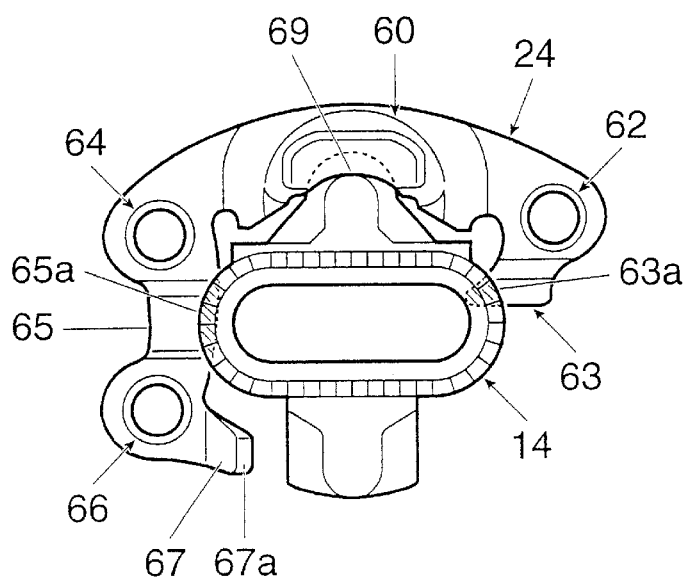
FIG. 6 is a top plan view of the front clamping member of the left bicycle pedal illustrated in FIGS. 1–5, with a cleat coupled thereto and the contact portions being hatched for purposes of illustration of the preferred embodiment of the present invention.

As seen in FIGS. 3–5, bicycle pedal 10 basically includes a pedal shaft or spindle 20 adapted to be coupled to crank arm 16 and a pedal body 22 rotatably coupled to spindle 20 for supporting a cyclist's foot. Pedal body 22 basically includes a pair of front clamping members 24 and a pair of rear clamping members 26. Each rear clamping member 26 is pivotally coupled to pedal body 22 by a pivot pin 28, a biasing member 30 and a tension adjusting mechanism 32 as seen in FIGS. 2 and 3. Each front clamping member 24 is fixedly (rigidly) coupled to pedal body 22 by a plurality (three) of attachment bolts 34 as seen in FIG. 4. Clamping members 24 and 26 are arranged such that one of the front clamping members 24 and one of the rear clamping members 26 are arranged at each end of pedal body 22 and on opposite sides from each other. Thus, each side of the pedal body 22 has a front cleat engagement mechanism on one end of pedal body 22 and a rear cleat engagement mechanism on the opposite end of pedal body 22. This arrangement allows the cyclist's cleat to be engaged with either side of pedal 10.

Cleat 14 is designed to releasably couple sole 18 of shoe 12 to bicycle pedal 10 using one of the front clamping members 24 and one of the rear clamping members 26 at the same time. This type of pedal is often called a step-in or clipless pedal. Specifically, cleat 14 is engaged with pedal 10 by pressing cleat 14 into pedal 10 with a forward and downward motion. This releasably locks cleat 14 to pedal 10 via one of the sets of clamping members 24 and 26. Cleat 14 can be released from pedal 10 by twisting the heel of the shoe to the outside of pedal 10, as discussed below in more detail.

Referring now to FIG. 5, pedal shaft 20 is preferably a multi-step spindle having numerous stepped portions. Pedal shaft 20 is received in a stepped bore 35 formed in pedal body 22. Pedal shaft 20 has a first end 36 with threads formed thereon for threadedly coupling pedal 10 to crank 16 in a conventional manner. Pedal shaft 20 has a second end 38 that rotatably supports pedal body 22 in a conventional manner. Pedal body 22 can freely rotate about the center longitudinal axis A of pedal shaft 20. Since pedal shaft 20 is relatively conventional and its specific construction is not critical to the present invention, the construction of pedal shaft 20 will not be discussed or illustrated in detail herein.

Figure 7:
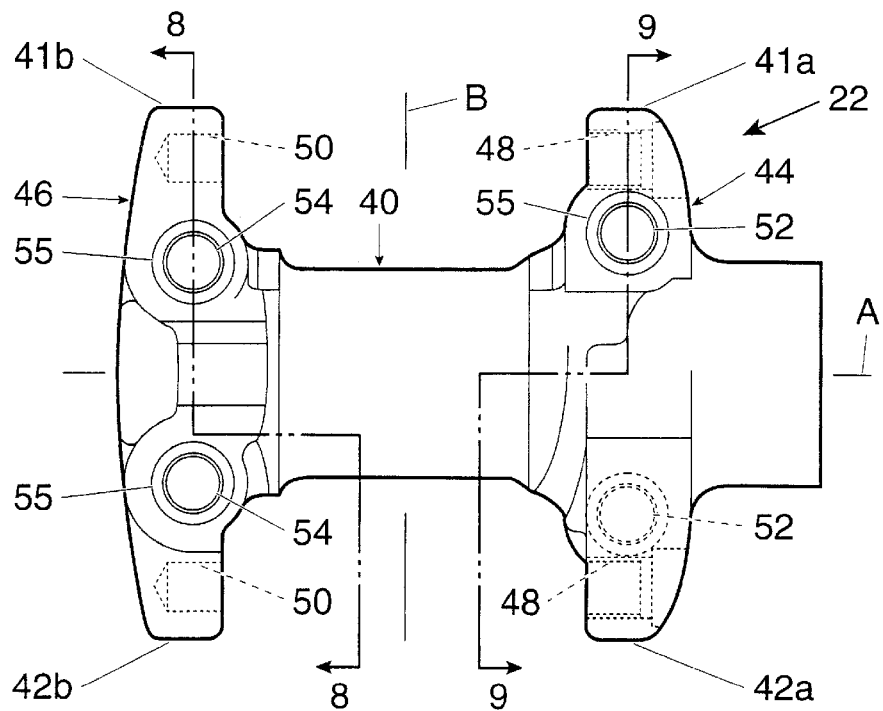
FIG. 7 is an enlarged top plan view of the pedal body for the left bicycle pedal illustrated in FIGS. 1–5.
Figure 8:
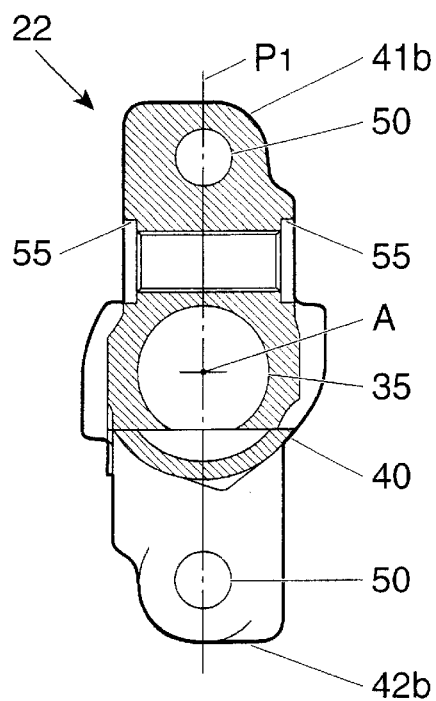
FIG. 8 is a cross-sectional view of the pedal body illustrated in FIG. 7 as viewed along section line 8—8 of FIG. 7.
Figure 9:
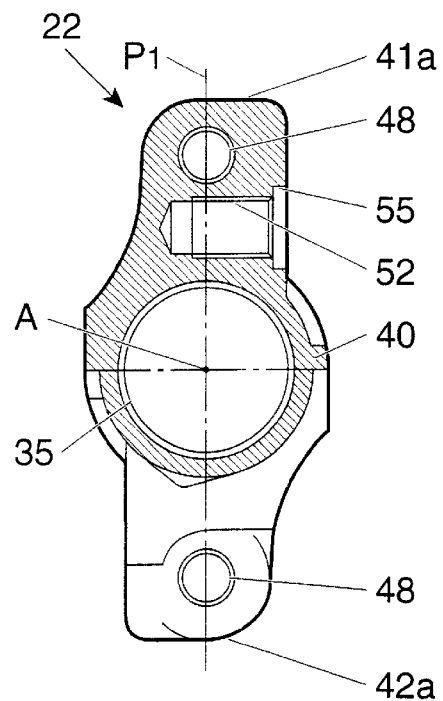
FIG. 9 is a cross-sectional view of the pedal body illustrated in FIGS. 7 and 8 as seen along section line 9—9 of FIG. 7.
Figure 15:
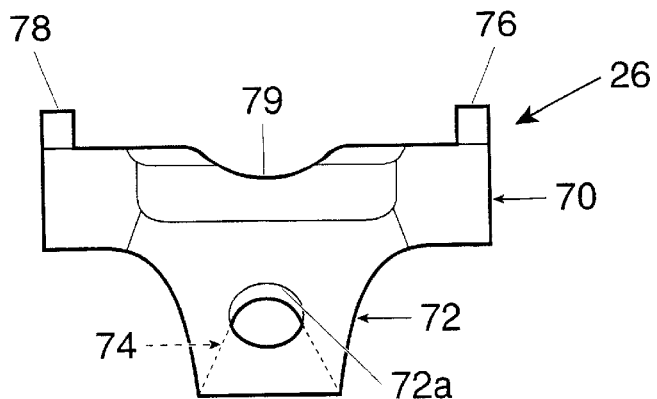
FIG. 15 is a top plan view of the rear clamping member of the left bicycle pedal illustrated in FIGS. 1–5.
Figure 16:
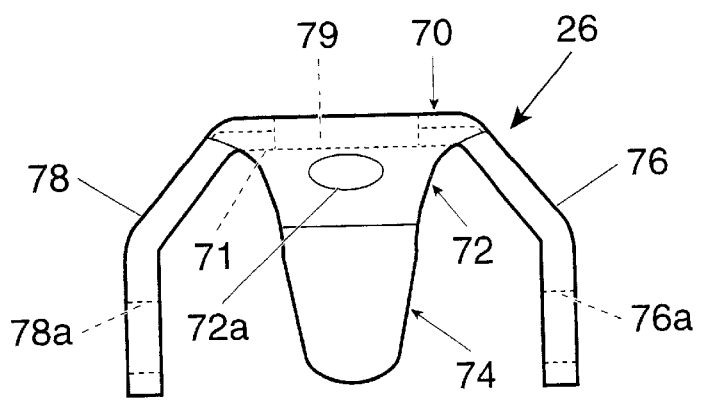
FIG. 16 is a rear end elevational view of the rear clamping member illustrated in FIG. 15.
Figure 17:
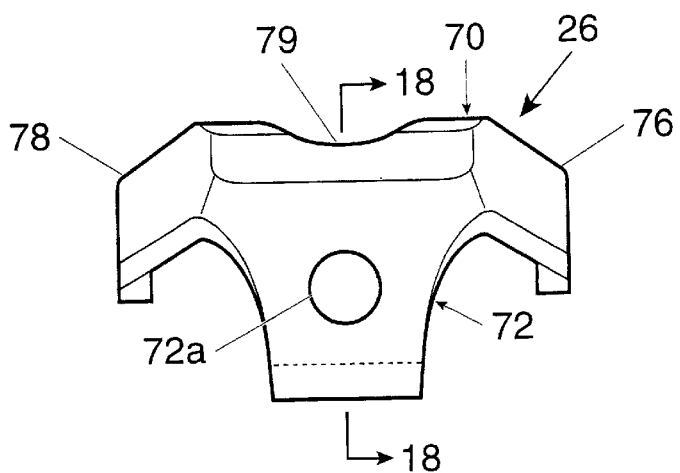
FIG. 17 is an angled elevational view of the rear clamping member illustrated in FIGS. 15 and 16 as viewed along the axis of the adjustment hole formed in the rear clamping member.
Figure 18:
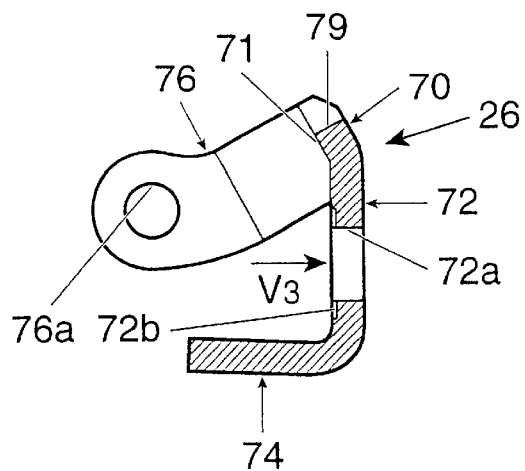
FIG. 18 is a cross-sectional view of the rear clamping member illustrated in FIGS. 15–17 as viewed along section line 18—18 of FIG. 17.
Figure 19:
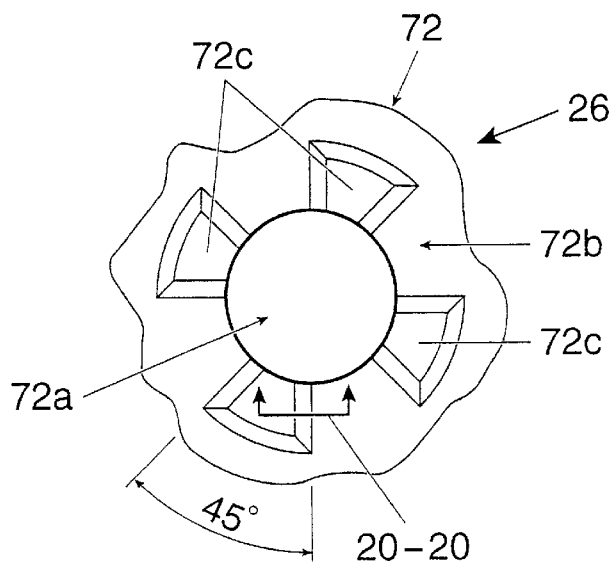
FIG. 19 is an enlarged, partial elevational view of the adjustment hole and indexing surface of the adjustment portion of the rear clamping member illustrated in FIGS. 15–18 as viewed along arrow $V_3$.
Figure 20:
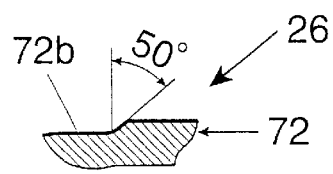
FIG. 20 is a partial, cross-sectional view of a portion of one of the indexing recesses formed around the adjustment hole illustrated in FIG. 19 as seen along section line 20—20 of FIG. 19.
Figure 21:
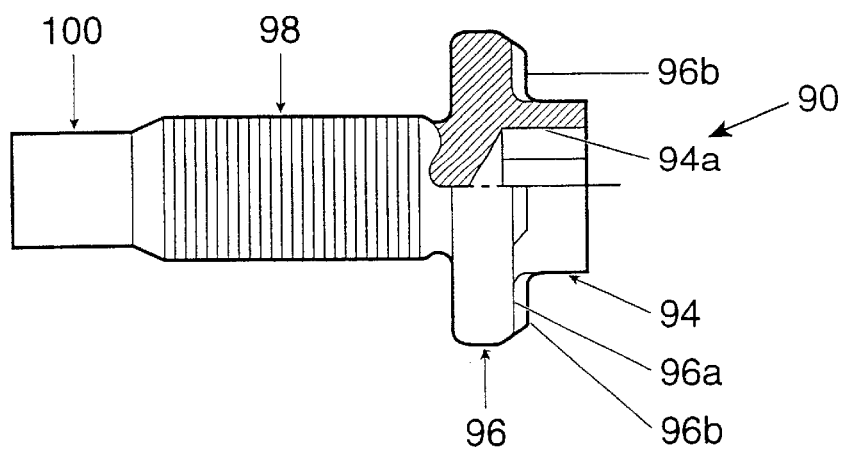
FIG. 21 is an enlarged side elevational view of an adjustment member of the left bicycle pedal illustrated in FIGS. 1–5, with a portion broken away to show a hexagonal bore.
Figure 22:
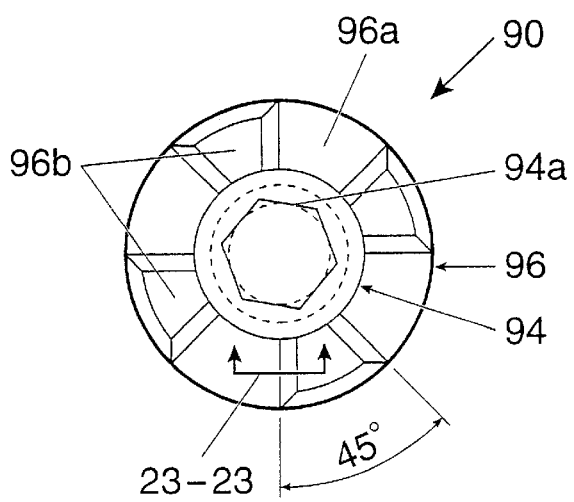
FIG. 22 is an end elevational view of the adjustment member illustrated in FIG. 21.
Figure 23:
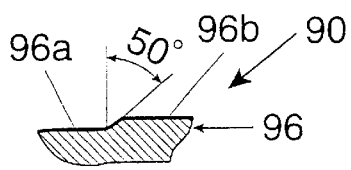
FIG. 23 is a partial, cross-sectional view of one of the indexing projections of the adjustment member illustrated in FIGS. 21 and 22 as viewed along section line 23—23 of FIG. 22.
Figure 24:
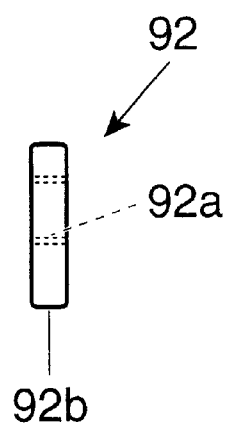
FIG. 24 is an enlarged, side elevational view of an adjustment plate of the adjustment mechanism for the left bicycle pedal illustrated in FIGS. 1–5.
Figure 25:
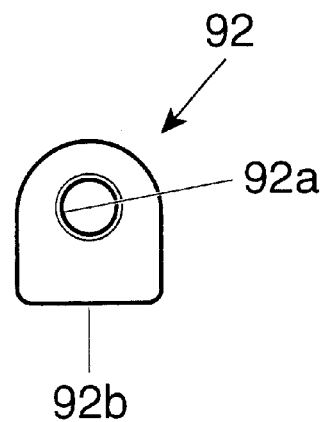
FIG. 25 is an end elevational view of the adjustment plate illustrated in FIG. 24.
Figure 26:
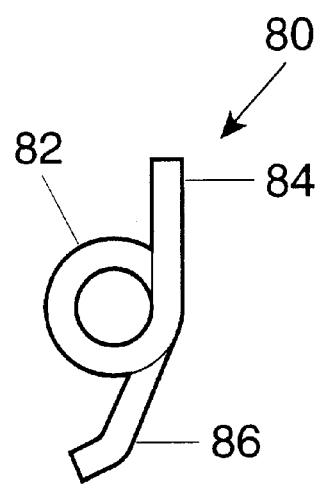
FIG. 26 is an enlarged side elevational view of one of the torsion springs of one of the biasing members for the left bicycle pedal illustrated in FIGS. 1–5.
Figure 27:
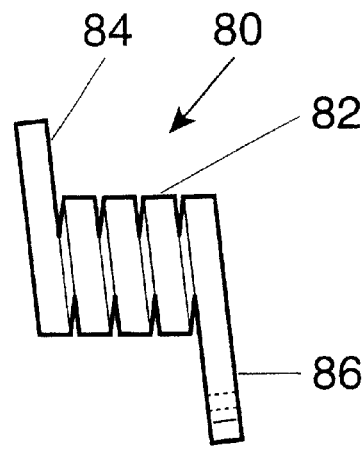
FIG. 27 is a side elevational view of the torsion spring illustrated in FIG. 26.
Figure 28:
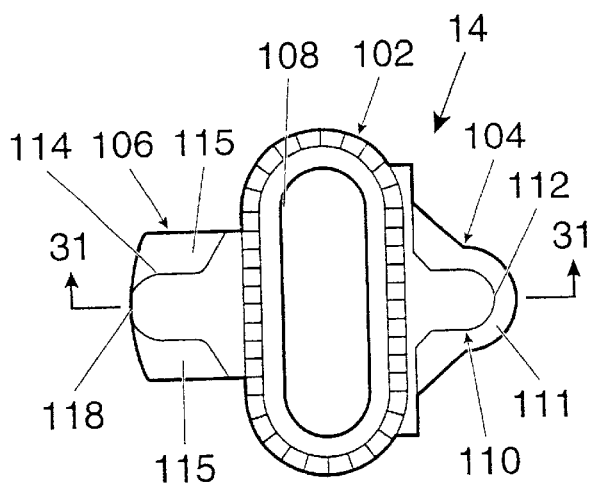
FIG. 28 is an enlarged, top plan view of a bicycle cleat for the left bicycle pedal illustrated in FIGS. 1–5.
Figure 29:
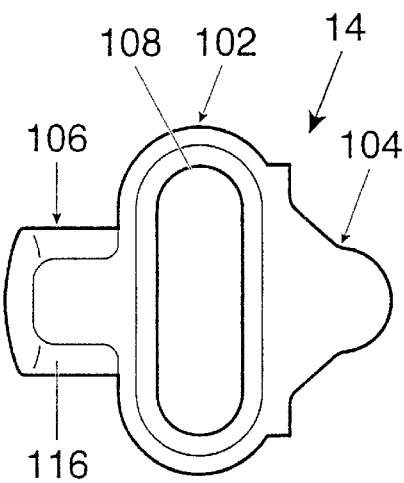
FIG. 29 is a bottom plan view of the bicycle cleat illustrated in FIG. 28.
Figure 30:
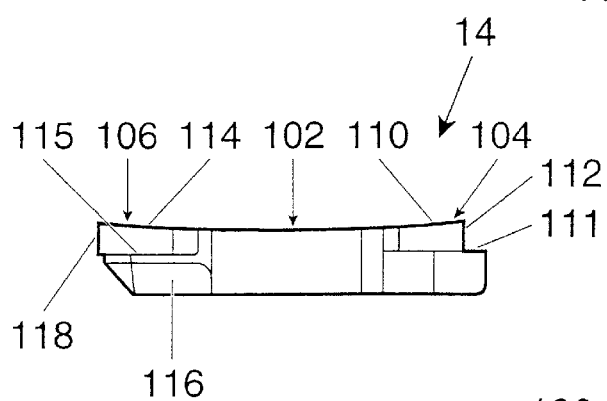
FIG. 30 is a side elevational view of the bicycle cleat illustrated in FIGS. 28 and 29.
Figure 31:
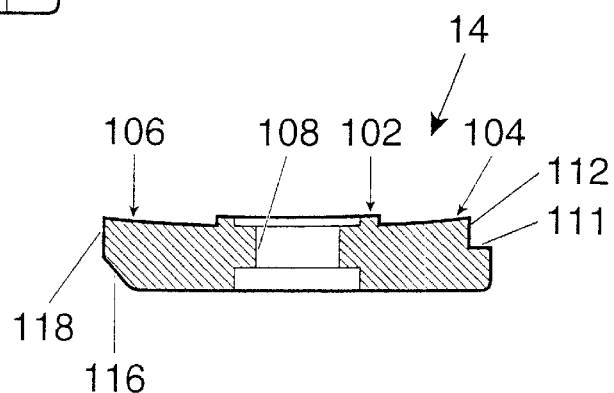
FIG. 31 is a cross-sectional view of the bicycle cleat illustrated in FIGS. 28–30 as seen along section line 31—31 of FIG. 28.

Referring to FIGS. 7–9, pedal body 22 has a center tubular portion 40, a pair of first end flanges 41a and 41b, and a pair of second end flanges 42a and 42b. Tubular portion 40 rotatably receives pedal shaft 20 therein for rotation about center longitudinal axis A. The first end flanges 41a and 41b form a first end of pedal body 22, while the second end flanges 42a and 42b form a second end of pedal body 22. The first and second ends 41a, 41b and 42a, 42b are arranged on opposite ends of center tubular portion 40. The flanges 41a and 42a with an inner part of tubular portion 40 form an inner longitudinal side 44, while the flanges 41b and 42b with an outer part of tubular portion 40 form an outer longitudinal side 46. Pedal body 22 is preferably made of a lightweight metallic material, such as aluminum alloy. In particular, pedal body 22 is an H-shaped member. Depending on the orientation of pedal body 20, one of the ends of pedal body 22 is considered a front or first end, while the other end is considered a second or rear end. One of the front clamping members 24 is fixedly coupled to flanges 41a, 41b and 42b by fasteners 34, while the other front clamping member 24 is fixedly coupled to flanges 42a, 42b and 41b via fasteners 34. More specifically, front clamping members 24 are coupled to opposite ends of pedal body 22 in substantially the same orientation as each other, but on opposite sides of pedal body 22. Rear clamping members 26 are pivotally coupled between longitudinal sides 44 and 46 of each end of pedal body 22. More specifically, one of the rear clamping members 26 is pivotally coupled to flanges 41a and 41b of pedal body 22 via one of the pivot pins 28, while the other clamping member 26 is pivotally coupled to flanges 42a and 42b of pedal body 22 via the other pivot pin 28.

Inner and outer side portions 44 and 46 extend forward and backward from center tubular portion 40, and are located on opposite sides of clamping members 26. Side portion 44 is an inner side portion, while side portion 46 is an outer side portion. Threaded through holes 48 are formed in flanges 41a and 42a of inner side portion 44 for threadedly securing pivot pins 28 therein. Blind bores 50 are formed in flanges 41b and 42b of outer side portion 46 for receiving the ends of pivot pins 28 therein. Biasing members 30 and rear clamping members 26 are mounted on pivot pins 28 such that clamping members 26 are movable between a clamping position and a release position. Biasing members 30 engage clamping members 26 such that clamping members 26 are normally biased toward the clamping position.

As seen in FIGS. 4 and 7, pedal body 22 has a center longitudinal axis B extending between the front and rear ends. Center longitudinal axis B is substantially parallel to inner and outer side portions 44 and 46, and is substantially perpendicular to center longitudinal axis A of pedal shaft 20. Preferably, a longitudinal plane $P_1$ passing through both center longitudinal axis A and center longitudinal axis B has a cleat receiving area formed on each side thereof. In other words, each cleat receiving area is formed by one of the front clamping members 24 and one of the rear clamping members 26 arranged on one side of the longitudinal plane $P_1$ of pedal body 22.

Clamping members 24 and 26 selectively engage cleat 14 of bicycle shoe 12 to attach the sole of bicycle shoe 12 to pedal 10. Clamping members 24 are preferably fixedly coupled to opposite ends of pedal body 22, while clamping members 26 are preferably pivotally coupled to opposite ends of pedal body 22 by pivot pins 28.

As mentioned above, each front clamping member 24 is preferably fixedly coupled to pedal body 22 by a plurality (three) of attachment bolts 34. More specifically, pedal body 22 preferably has a pair of threaded blind bores 52 formed in inner side portion 44 and a pair of threaded through bores 54 formed in outer side portion 46. Blind bores 52 extend substantially in a perpendicular direction to the longitudinal plane $P_1$ of pedal body 22, but in opposite directions from each other. In other words, threaded blind bores 52 have their axes substantially parallel. Through bores 54 have their axes substantially parallel to each other and to blind bores 52. Both threaded blind bores 52 and threaded through bores 54 are designed to receive attachment bolts 34 therein. More specifically, each side of the longitudinal plane $P_1$ of pedal body 22 is designed to have one of the front clamping members 24 fixedly coupled thereto by three attachment bolts 34. Thus, threaded through bores 54 each have two attachment bolts 34 received therein from opposite sides of pedal body 22 to couple both clamping members 24 to pedal body 22. The open ends of bores 52 and 54 are countersunk to form annular recesses 55 around bores 52 and 54. These annular recesses 55 receive a portion of the front clamping members 24, as explained below.

Referring to FIGS. 10–14, front clamping members 24 will now be discussed in more detail. Each clamping member 24 is preferably a plate-shaped member formed of rigid metallic material, such as steel. Each clamping member 24 basically includes a cleat engagement portion 60, an inner attachment point 62, a first outer attachment point 64 and a second outer attachment point 66. The inner attachment point 62 and the first outer attachment point 64 are arranged on opposite sides of cleat engagement portion 60, and fixedly coupled to longitudinal sides 44 and 46 of pedal body 22 at each of the flanges 41a, 41b, 42a and 42b.

Each cleat engagement portion 60 has a cleat engagement surface 61 facing the longitudinal plane $P_1$ of pedal body 22. Each cleat engagement surface 61 is spaced from opposite sides of the longitudinal plane $P_1$ of pedal body 22 and substantially parallel to the longitudinal plane $P_1$ of pedal body 22 to engage a portion of cleat 14. First and second outer attachment points 64 and 66 are configured to be aligned with outer threaded through bores 54. Thus, outer attachment points 64 and 66 are arranged on opposite sides of the center longitudinal axis A of pedal shaft 20. Each of the attachment points 62, 64 and 66 has a through bore 62a, 64a or 66a, respectively, extending therethrough to receive one of the attachment bolts 34. Moreover, each attachment point 62, 64 and 66 includes a projecting portion 62b, 64b or 66b, respectively, configured to be received in one of the recesses 55 surrounding blind bores 52 or threaded bores 54.

As seen in FIGS. 10 and 11, inner attachment point 62 preferably includes a flange 63 extending longitudinally therefrom. Flange 63 has an upper surface or inner cleat contact surface 63a facing substantially in the opposite direction of cleat engagement surface 61. Cleat contact surface 63a is preferably spaced toward the longitudinal plane $P_1$ of pedal body 22 from cleat engagement surface 61 to secure cleat 14 therebetween.

Additionally, a connecting portion 65 preferably extends between first outer attachment point 64 and second outer attachment point 66. Connecting portion 65 preferably includes an outer cleat contact surface 65a facing in substantially the opposite direction of cleat engagement surface 61, and spaced from cleat engagement surface 61 toward the longitudinal plane $P_1$ of pedal body 22 to couple cleat 14 therebetween.

Second outer attachment point 66 preferably includes an angled protrusion or flange 67 extending inwardly therefrom toward inner longitudinal side 46. Protrusion 67 insures that cleat 14 is properly coupled to bicycle pedal 10. More specifically, protrusion 67 insures that cleat 14 cannot be engaged backwards (i.e., the front of cleat 14 cannot be coupled to rear clamping member 26). Preferably, angled protrusion 67 includes an angled guide surface 67a formed at a free end thereof. Angled guide surface 67a slopes upwardly and outwardly relative to longitudinal plane $P_1$ to aid in guiding cleat 14 to disengage cleat 14 from pedal 10 (i.e. release from rear clamping member 26).

Cleat engagement portion 60 has a curved front stop surface 69, which is perpendicularly arranged relative to cleat engagement surface 61. Stop surface 69 prevents forward movement of cleat 14 relative to pedal body 22, when cleat 14 is engaged with one of the front clamping members 24.

As seen in FIGS. 2–5, each clamping member 24 is configured to form an unobstructed longitudinal passageway 68, which allows mud to easily push therethrough via cleat 14. Each unobstructed longitudinal passageway 68 has a substantially trapezoidal shape as viewed longitudinally along a cleat receiving plane CR, as seen in FIG. 5. More specifically, cleat engagement portion 60 is shaped generally as an inverted symmetrical U-shaped member (FIG. 14) with the ends attached to pedal body 22 to form passageway 68. Thus, passageway 68 extends in a longitudinal direction between each front clamping member 24 and pedal body 22. In other words, each longitudinal passageway 68 has a height H at least substantially equal to the distance between its respective clamping member 24 and a plane $P_2$ that is formed by the contact surfaces 63a and 65a, as seen in FIG. 5.

More specifically, each longitudinal passageway 68 has an effective height larger than the dimension H because an upper surface of respective flanges 41a, 41b or 42a, 42b of a respective end of pedal body 22 is offset toward the plane $P_1$ from the plane $P_2$. In other words, the upper surfaces of the flanges 41a, 41b or 42a, 42b (which are arranged below the respective cleat engagement portions 60) lie in a plane $P_3$ that is closer to the plane $P_1$ than the plane $P_2$ to effectively increase the height of the unobstructed longitudinal passageway(s) 68 in the area below the cleat engagement portion(s) 60. Moreover, opposing clamping member 26 (located on the same end as clamping member 24 and on an opposite side of pedal body 22) is preferably spaced from the upper surface of respective flanges 41a, 41b or 42a, 42b of a respective end of pedal body 22 to further effectively increase the height of the unobstructed longitudinal passageway 68. In particular, a plane $P_4$ passing through an upper periphery of the opposing clamping member 26 is spaced toward the plane $P_1$ from the plane $P_3$ to effectively increase the height of the unobstructed longitudinal passageway(s) 68 in the area below the respective cleat engagement portion(s) 60. Accordingly, each longitudinal passageway 68 preferably has an effective height even larger than the distance between its respective clamping member 24 and an upper surface of respective flanges 41a, 41b or 42a, 42b of a respective end of pedal body 22.

The plane $P_2$ that contains contact surfaces 63a and 65a forms an attachment surface of pedal body 22. Preferably, plane $P_2$ is parallel to plane $P_1$. Moreover, each longitudinal passageway 68 has a varying width at least as large as a width $W_1$ of cleat engagement surface 61 due to the trapezoidal shape of the unobstructed longitudinal passageway 68, as seen in FIG. 5. More specifically, each longitudinal passageway 68 preferably has a minimum width $W_{min}$ at least as large as width $W_1$ and a maximum width $W_{max}$ equal to at least one third of a maximum transverse width of clamping member 24, as seen in FIGS. 5 and 14. Moreover, each longitudinal passageway 68 preferably has an effective maximum width $W_{eff}$ in the area directly below the cleat engagement portion 60 (e.g. in the area below the plane $P_2$ that is larger than the maximum width $W_{max}$. Thus, the effective maximum width $W_{eff}$ is preferably at least one half of the maximum transverse width of clamping member 24, as seen in FIG. 4. The effective maximum width $W_{eff}$ of each longitudinal passageway 68 is preferably measured between inner sides of longitudinal side portions 44 and 46 at each end of pedal body 22 in the area located between the planes $P_3$ and $P_4$.

Referring now to FIGS. 15–18, each clamping member 26 basically includes a cleat engagement portion 70, an adjustment portion 72, a protecting portion or tongue 74 and a pair of flanges 76 and 78 with pivot holes 76a and 78a, respectively. Clamping member is preferably formed of a substantially rigid, lightweight material. Cleat engagement portion 70 includes a rear cleat engagement surface 71 facing in substantially the same direction as front cleat engagement surface 61. Preferably, cleat engagement surface 71 is spaced from the longitudinal plane $P_1$ of pedal body 22 and faces toward the longitudinal plane $P_1$ of pedal body 22. Moreover, cleat engagement surface 71 is preferably substantially parallel to the longitudinal plane $P_1$ of pedal body 22. Cleat engagement portion 70 also has a curved rear stop surface 79, which is perpendicularly arranged relative to cleat engagement surface 71. Stop surface 79 prevents rearward movement of cleat 14 relative to pedal body 22, when cleat 14 is engaged with one of the sets of front and rear clamping members 24 and 26.

Adjustment portion 72 of each clamping member 26 preferably includes a hole 72a and an internal indexing surface 72b surrounding hole 72a. Hole 72a is configured to receive a part of tension adjusting mechanism 32, as discussed in more detail below. Indexing surface 72b preferably includes four recesses 72c circumferentially spaced around hole 72a. Each recess 72c includes a pair of angled side walls and an angled end wall. Indexing surface 72b is configured to engage a mating indexing surface of tension adjusting mechanism 32, as also discussed below.

Adjustment portion 72 is preferably angled relative to cleat attachment portion 70. Additionally, protecting portion or tongue 74 is preferably angled relative to adjustment portion 72 and extends from one end thereof. Flanges 76 and 78 extend from cleat engagement portion 70 and adjustment portion 72 for coupling each clamping member 26 to pedal body 22 via pivot pins 28. More specifically, each of the holes 76a and 78a of flanges 76 and 78, respectively, are configured to receive a bushing (not shown), which in turn rotatably receives one of the pivot pins 28. Each biasing member 30 is mounted on one of the pivot pins 28 to apply an urging force between pedal body 22 and clamping member 26 to bias clamping member 26 toward a clamping position.

Referring to FIGS. 2–4, 26 and 27, each biasing member 30 is preferably formed by a pair of torsion springs 80 that are mirror images of each other. Each of the torsion springs 80 basically includes a coiled portion 82, a straight end 84 and a bent end 86. Each straight end 84 extends from one end of coiled portion 82 and is arranged to engage a portion of hub body 22 adjacent one of the inner and outer longitudinal sides 44 or 46. Each bent end 86 extends from the other end of coiled portion 82 and is arranged to contact a portion of tension adjustment mechanism 32 (adjacent longitudinal axis B). More specifically, each straight end 84 is designed to engage center tubular portion 40 of pedal body 22 (adjacent one of the inner and outer longitudinal sides 44 or 46), while each bent end 86 is configured to engage an adjustment plate of tension adjustment mechanism 32 (adjacent longitudinal axis B), as discussed below. Coiled portions 82 of torsion springs 80 are mounted on one of the pivot pins 28, such that biasing members 30 normally urge clamping members 26 to rotate about their respective pivot pins 28 from their cleat releasing positions to their cleat engaging or clamping positions.

Referring now to FIGS. 18–27, tension adjustment mechanism 32 basically includes an adjustment bolt or member 90 and an adjustment nut or plate 92 adjustably mounted on adjustment member 90 to adjust tension of biasing member 30 on each clamping member 26. Adjustment member 90 basically includes a head 94, an enlarged section 96 adjacent head 94, a threaded section 98 extending from enlarged section 96 and an unthreaded section 100 extending from threaded section 98 to form a free end of adjustment member 90.

Threaded section 98 is preferably formed with counterclockwise threads such that rotation of adjustment member 90 in the clockwise (or positive) direction increases the biasing force of biasing member 30. Head 94 is configured to be received in hole 72a of adjustment portion 72 of each clamping member 26 from a biasing member side thereof. Thus, enlarged section 96 is arranged on a biasing member side of clamping member 26.

Enlarged section 96 includes an indexing or mating surface 96a configured to engage indexing surface 72b of adjustment portion 72. Specifically, indexing surface 96a is preferably provided with four projections 96b circumferentially spaced around head 94. Each projection includes a pair of angled side walls and an angled end wall and is configured to mate with one of the recesses 72c of clamping member 26. Indexing surface 96a is configured to engage mating indexing surface 72b to prevent relative rotation therebetween.

The angled surfaces of protrusions 96b and recesses 72c act as ramp surfaces such that a sufficient rotational force causes adjustment member 90 to rotate relative to clamping member 26. Thus mating surfaces 72b and 96a prevent accidental adjustment of tension adjusting mechanism 32. Alternatively, adjustment member 90 is moved axially toward biasing member 30 (with a hexagonal wrench) and against the force of torsion springs 80 until mating surfaces 72b and 96a are no longer engaged. Then adjustment member 90 can be rotated to adjust the biasing force of biasing member 30. After the desired biasing force is achieved, adjustment member 90 is released so mating surfaces 72b and 96a re-engage. Unthreaded section 100 preferably has a slightly smaller diameter than threaded section 98 such that adjustment plate 92 is movable thereon. However, due to this configuration of adjustment member 90 (with unthreaded section 100 extending from threaded section 98), adjustment plate 92 is retained with adjustment member 90 (on unthreaded section 100) when adjustment plate 92 is completely disengaged from threaded section 98. Head 94 of adjustment member 90 has a hexagonal bore 94a formed therein such that adjustment member 90 can be rotated with a conventional hexagonal wrench.

Adjustment plate 92 includes a threaded hole 92a formed therein. Threaded hole 92a is configured such that adjustment plate 92 is threadedly mounted on threaded section 98 of adjustment member 90. Adjustment plate 92 preferably has a non-circular shape such that a flat wall or abutment surface 92b is formed. Flat wall 92b is arranged adjacent an internal surface of protecting portion or tongue 74 of clamping member 26, such that adjustment plate 92 will not rotate even when adjustment member 90 is rotated via the hexagonal wrench. Thus, when adjustment plate 92 is threaded mounted on threaded section 98, adjustment member 90 can be rotated such that the position of adjustment plate 92 can be adjusted relative to torsion springs 80. More specifically, adjustment plate 92 is configured to engage bent ends 86 of torsion springs 80 such that the tension applied to clamping members 26 by torsion springs 80 is adjustable.

Due to the configurations of adjustment member 90 and adjustment plate 92, tension adjusting mechanism 32 will not become detached from bicycle pedal 10 even if adjustment member 90 is completely disengaged from adjustment plate 92, or if adjustment member 90 is rotated such that adjustment plate 92 contacts enlarged section 96. Therefore, adjustment mechanism 32 provides an adjustment of the tension of the biasing members 30 without risk of separation of the parts of each tension adjusting mechanism 32.

Referring to FIGS. 28–31, cleat 14 will be discussed in more detail. Bicycle shoe cleat 14 basically includes an attachment portion 102, a first coupling portion or member 104 extending from one end of attachment portion 102, and a second coupling portion or member 106 extending from the other end of attachment portion 102. Attachment portion 102 has an upper sole side facing in a first direction for engaging sole 18 of shoe 12 and a lower pedal side facing in a second direction which is substantially opposite to the first direction. Preferably, attachment portion 102 and coupling portions 104 and 106 are integrally formed together as a one-piece, unitary member, which is constructed from a suitable rigid material. Attachment portion 102 has a hole or slot 108 for receiving one or more fasteners for fixedly coupling cleat 14 to sole 18 of the cyclist's shoe 12 in a relatively conventional manner. The interconnection of cleat 14 to sole 18 is relatively well known in the art, and thus, this interconnection will not be discussed or illustrated in detail herein. First or front coupling portion 104 has a nose portion 110 with a first coupling surface 111 facing towards sole 18 of shoe 12. First coupling surface 111 is located between the upper and lower pedal sides of attachment portion 102.

Front coupling portion 104 forms a first coupling member that extends from the front end of attachment portion 102. Front coupling portion 104 has its nose portion 110 designed to engage cleat engagement portion 60 of each clamping member 24. Nose portion 110 also has a curved stop surface 112 formed thereon, which extends substantially perpendicular to coupling surface 111. Coupling surface 111 is preferably a substantially flat, planar surface which is designed to engage cleat engagement surface 61 of cleat engagement portion 60 of clamping member 24, discussed above. More specifically, coupling surface 111 is a substantially flat or planar surface that curves about curved stop surface 112.

Curved stop surface 112 is designed to engage curved stop surface 69 of each clamping member 24 to prevent forward movement of cleat 14 relative to pedal body 22. Curved stop surfaces 69 and 112 together act as a pivot point for releasing cleat 14 from pedal body 22.

Second or rear coupling portion 106 extends from the second end of attachment portion 102 and has a nose portion 114 with a pair of second coupling surfaces 115 facing in substantially the same direction as coupling surface 111 of first coupling portion 104. Rear coupling surfaces 115 of rear coupling portion 106 engage rear cleat engagement surface 71 of rear cleat engagement portion 70 of clamping member 26 to secure cleat 14 to pedal body 22 via clamping members 24 and 26.

Rear coupling surfaces 115 are preferably substantially flat planar surfaces. Rear attachment portion 106 also has a curved or angled ramp surface 116 which is designed to engage cleat engagement portion 70 of clamping member 26 during coupling of cleat 14 to pedal body 22. In particular, ramp surface 116 is designed to rotate clamping member 26 rearwardly from its normal cleat engaging position to its cleat releasing position during the downward movement of cleat 14 relative to pedal body 22. Rear coupling portion 106 also includes a curved stop surface 118 for engaging curved stop surface 79 of clamping member 26 to prevent rearward movement of cleat 14 relative to pedal body 22 when coupled thereto.

In coupling cleat 14 to bicycle pedal 10, the rider steps onto pedal body 22 which in turn causes one of the clamping members 26 to rotate rearwardly and allow cleat 14 to be coupled to pedal body 22. Tension adjusting mechanisms 32 can be adjusted to vary the force required for inserting/releasing the shoe cleat 14 from the bicycle pedal 10.

More specifically, when attaching the cyclist's shoe to the bicycle pedal 10 through cleat 14, the cyclist moves the shoe 12 downwardly and forwardly relative to pedal body 22 such that the front end or nose portion 110 of cleat 14 engages cleat engagement portion 60 of one of clamping members 24. Once the front end of cleat 14 is engaged with one of the cleat engagement portions 60, the cyclist places the rear end of cleat 14 in contact with rear cleat engagement portion 70 of one of the clamping members 26. This causes ramp surface 116 to act as a cam, which engages the cleat engagement portion 70 of one of the rear clamping members 26 to cause rotation thereof. In this position, the cyclist presses the shoe 12 downwardly against pedal 10 to cause one of the clamping members 26 to initially pivot rearwardly against the force of one of the sets of torsion springs 80 to a cleat releasing position. The rear end of cleat 14 then enters a position opposite of back face of one of the engagement portions 70 of one of the clamping members 26. Then, clamping member 26 returns under the force of its respective set of torsion springs 80 so that rear engagement portion 70 of clamping member 26 engages the rear end of cleat 14. This engagement fixes the cyclist's shoe to pedal 10 via cleat 14.

In the cleat engaged position, the front coupling portion 104 of cleat 14 prevents front vertical movement while the rear coupling portion 106 prevents rear vertical movement. Specifically, cleat engagement surface 61 of clamping member 24 contacts first coupling surface 111 while cleat engagement surface 71 of clamping member 26 contacts rear coupling surface 115 of cleat 14 to fixedly couple rear coupling portion 106 of cleat 14 to pedal body 22.

When releasing the shoe 12 from pedal 10, the cyclist will typically turn shoe 12 about an axis perpendicular or approximately perpendicular to the longitudinal plane of pedal body 22. As a result of this pivoting action, clamping member 26 is pivoted against the force of torsion springs 80 to a cleat releasing position to release the shoe 12 from pedal 10.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle pedal comprising:

a pedal shaft having a first end adapted to be coupled to a bicycle crank and a second end with a center axis extending between said first and second ends;

a pedal body rotatably coupled to said second end of said pedal shaft, said pedal body having a first end and a second end with inner and outer longitudinal sides extending between said first and second ends, said pedal body having a longitudinal plane extending between said first and second ends and passing through said center axis;

a first clamping member pivotally coupled to said first end of said pedal body between a clamping position and a release position, said first clamping member having a first cleat engagement surface;

a first biasing member coupled between said pedal body and said first clamping member; and a second clamping member fixedly coupled to said second end of said pedal body, said second clamping member having a second cleat engagement surface arranged between said inner and outer longitudinal sides of said pedal body and facing said longitudinal plane, said second clamping member and said pedal body being configured relative to each other to form an unobstructed longitudinal passageway between said second clamping member and said pedal body as viewed along a cleat receiving plane that is substantially parallel to said longitudinal plane of said pedal body, said unobstructed longitudinal passageway being free of any structure of said pedal body and extending completely through said second clamping member such that mud can be pushed out of said unobstructed longitudinal passageway from between said second clamping member and said pedal body along said cleat receiving plane, said unobstructed longitudinal passageway having a width at least as large as a width of said second cleat engagement surface.

2. A bicycle pedal according to claim 1, wherein said unobstructed longitudinal passageway has a maximum width that is at least one-third of a maximum transverse width of said second clamping member.

3. A bicycle pedal according to claim 2, wherein said maximum width of said unobstructed longitudinal passageway is effectively increased by an open area thereunder, and said effectively increased maximum width is at least one-half of said maximum transverse width of said second clamping member.

4. A bicycle pedal according to claim 1, wherein said first end of said pedal body is formed by first inner and outer flanges and said second end of said pedal body is formed by second inner and outer flanges.

5. A bicycle pedal according to claim 4, wherein
said second clamping member includes an inner attachment point coupled to said second inner flange and an outer attachment point coupled to said second outer flange.

6. A bicycle pedal according to claim 5, wherein
said second clamping member includes an inner cleat contact surface adjacent said inner attachment point.

7. A bicycle pedal according to claim 4, wherein
said second clamping member includes a first attachment point coupled to said first outer flange and a second attachment point coupled to said second outer flange.

8. A bicycle pedal according to claim 1, wherein
said second clamping member is fixedly coupled to said pedal body on opposite sides of said unobstructed longitudinal passageway with at least two bolts.

9. A bicycle pedal according to claim 8, wherein
said second clamping member is fixedly coupled to said pedal body with at least three bolts such that two of said bolts are located on one side of said unobstructed longitudinal passageway and the other of said at least three bolts is located on an opposite side of said unobstructed longitudinal passageway.

10. A bicycle pedal according to claim 1, further comprising
a third clamping member pivotally coupled to said second end of said pedal body, said third clamping member having a third cleat engagement surface;
a second biasing member coupled between said pedal body and said third clamping member; and
a fourth clamping member coupled to said first end of said pedal body, said fourth clamping member having a fourth cleat engagement surface arranged between said inner and outer longitudinal sides of said pedal body and facing said longitudinal plane, said fourth clamping member being configured to form an additional unobstructed longitudinal passageway with a width at least as large as a width of said fourth cleat engagement surface.

11. A bicycle pedal according to claim 1, further comprising
an adjustment member arranged between said first clamping member and said biasing member, said adjustment member having a head arranged in a hole of said first clamping member, an enlarged section arranged on a biasing member side of said first clamping member and an adjustment plate adjustably mounted on said adjustment member to adjust tension of said biasing member on said first clamping member.

12. A bicycle pedal comprising:
a pedal shaft having a first end adapted to be coupled to a bicycle crank and a second end with a center axis extending between said first and second ends;
a pedal body rotatably coupled to said second end of said pedal shaft, said pedal body having a first end with first inner and outer flanges and a second end with second inner and outer flanges to form inner and outer longitudinal sides extending between said first and second ends, said pedal body having a longitudinal plane extending between said first and second ends and passing through said center axis;
a first clamping member pivotally coupled to said first end of said pedal body between a clamping position and a release position, said first clamping member having a first cleat engagement surface;
a first biasing member coupled between said pedal body and said first clamping member; and
a second clamping member fixedly coupled to said second end of said pedal body, said second clamping member having an inner attachment point coupled to said second inner flange, an outer attachment point coupled to said second outer flange, an additional attachment point coupled to said first outer flange and a second cleat engagement surface arranged between said inner and outer longitudinal sides of said pedal body and facing said longitudinal plane, said second clamping member and said pedal body being configured relative to each other to form an unobstructed longitudinal passageway between said second clamping member and said pedal body as viewed along a cleat receiving plane that is substantially parallel to said longitudinal plane of said pedal body, said unobstructed longitudinal passageway being free of any structure of said pedal body and extending completely through said second clamping member such that mud can be pushed out of said unobstructed longitudinal passageway from between said second clamping member and said pedal body along said cleat receiving plane, said unobstructed longitudinal passageway having a width at least as large as a width of said second cleat engagement surface.

13. A bicycle pedal according to claim 12, wherein
said second clamping member includes an inwardly extending angled protrusion arranged adjacent said additional attachment point.

14. A bicycle pedal according to claim 13, wherein
said angled protrusion includes an angled guide surface formed at a free end thereof such that said angled guide surface slopes upwardly and outwardly relative to said longitudinal plane.

15. A bicycle pedal according to claim 12, wherein
said second clamping member includes an outer cleat contact surface arranged between said outer attachment point and said additional attachment point.

16. A bicycle pedal according to claim 15, wherein
said second clamping member includes an inner cleat contact surface adjacent said inner attachment point.

17. A bicycle pedal according to claim 1, wherein said unobstructed longitudinal passageway has a trapezoid shape.

18. A bicycle pedal according to claim 12, wherein said unobstructed longitudinal passageway has a trapezoid shape.

19. A bicycle pedal comprising:
a pedal shaft having a first end adapted to be coupled to a bicycle crank and a second end with a center axis extending between said first and second ends;
a pedal body rotatably coupled to said second end of said pedal shaft, said pedal body having a first end and a second end with inner and outer longitudinal sides extending between said first and second ends, said pedal body having a longitudinal plane extending between said first and second ends and passing through said center axis;
a first clamping member pivotally coupled to said first end of said pedal body between a clamping position and a release position, said first clamping member having a first cleat engagement surface;

a first biasing member coupled between said pedal body and said first clamping member; and a second clamping member fixedly coupled to said second end of said pedal body, said second clamping member having a second cleat engagement surface arranged between said inner and outer longitudinal sides of said pedal body and facing said longitudinal plane, said second clamping member and said pedal body being configured relative to each other to form an unobstructed longitudinal trapezoidal shaped passageway between said second clamping member and said pedal body as viewed along a cleat receiving plane that is substantially parallel to said longitudinal plane of said pedal body, said unobstructed longitudinal passageway being free of any structure of said pedal body and extending completely through said second clamping member.

* * * * *